US012440407B2

(12) United States Patent
Tsukada

(10) Patent No.: US 12,440,407 B2
(45) Date of Patent: Oct. 14, 2025

(54) MOVING APPARATUS

(71) Applicant: NTT, Inc., Tokyo (JP)

(72) Inventor: Shingo Tsukada, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/289,161

(22) PCT Filed: May 7, 2021

(86) PCT No.: PCT/JP2021/017484

§ 371 (c)(1),
(2) Date: Nov. 1, 2023

(87) PCT Pub. No.: WO2022/234646

PCT Pub. Date: Nov. 10, 2022

(65) Prior Publication Data

US 2024/0216196 A1 Jul. 4, 2024

(51) Int. Cl.

| | |
|---|---|
| ***A61G 5/14*** | (2006.01) |
| ***A61G 5/10*** | (2006.01) |
| ***A61G 5/12*** | (2006.01) |
| ***A61G 7/02*** | (2006.01) |

(52) U.S. Cl.

CPC ............. *A61G 5/14* (2013.01); *A61G 5/1056* (2013.01); *A61G 5/128* (2016.11); *A61G 7/02* (2013.01)

(58) Field of Classification Search

CPC ........ A61G 5/14; A61G 5/128; A61G 5/1056; A61G 7/00

USPC ........................................................ 280/47.4

See application file for complete search history.

(56) References Cited

U.S. PATENT DOCUMENTS

| | | | | |
|---|---|---|---|---|
| 2005/0216061 | A1* | 9/2005 | Kim | A61H 1/008 606/241 |
| 2007/0085405 | A1* | 4/2007 | Grotner | A61G 7/1096 297/423.11 |
| 2016/0184167 | A1* | 6/2016 | Naucke | A61G 5/1008 280/47.4 |
| 2019/0350411 | A1* | 11/2019 | Hart | A61G 5/1002 |
| 2023/0149234 | A1* | 5/2023 | Murayama | A61G 5/08 5/86.1 |
| 2024/0216196 | A1* | 7/2024 | Tsukada | A61G 7/02 |

FOREIGN PATENT DOCUMENTS

| | | | |
|---|---|---|---|
| JP | H01119133 A | * | 5/1989 |
| JP | H11-019133 A | | 1/1999 |
| JP | 2000232995 A | * | 8/2000 |

OTHER PUBLICATIONS

"Prevention of Industrial Accidents at Social Welfare Facilities", Japan Association of Safety and Health Consultants, Ministry of Health, Labour and Welfare, 2013.

* cited by examiner

*Primary Examiner* — John D Walters
*Assistant Examiner* — Hilary L Johns
(74) *Attorney, Agent, or Firm* — Harness, Dickey & Pierce, P.L.C.

(57) ABSTRACT

An apparatus for movement (10) includes a main frame (20) and a front frame (40) detachably attached to the main frame (20). The main frame (20) includes a seat face (23) which has a hole opened in a vertical direction (Z) and on which a user (U) sits, and includes a truck (21) arranged below the seat face (23) and opened backward. The front frame (40) includes a front leaning part (41) which is disposed above and forward of the main frame (20) and against which a user (U) sitting on the seat face (23) leans.

5 Claims, 10 Drawing Sheets

MOVING APPARATUS

CROSS-REFERENCE TO RELATED APPLICATIONS

This application is a 371 U.S. National Phase of International Application No. PCT/JP2021/017484, filed on May 7, 2021. The entire disclosure of the above application is incorporated herein by reference.

TECHNICAL FIELD

The present invention relates to an apparatus for movement.

BACKGROUND ART

A non-patent literature 1 describes a yearning for reduction in a burden on a caregiver and/or a care assistant who supports a patient or a person requiring care in the aging society.

And, in general, care equipment such as a care lift or a wheelchair is widely used in order to reduce a burden on a caregiver and/or a care assistant. For example, when a patient or a person requiring care lying in a bed uses a toilet, the patient and/or the person requiring care moves from the bed to care equipment such as the care lift or the wheelchair, and further moves to a seat of a toilet.

CITATION LIST

Non Patent Literature

[NPL 1] Ministry of Health, Labor and Welfare/Prefectural Labour Bureau/Labour Standards Inspection Office, "Industrial Accident Prevention at Social Welfare Facilities", Japan Association of Safety and Health Consultants; October 2013

SUMMARY OF INVENTION

Technical Problem

However, with the above-mentioned care equipment, when the patient or the person requiring care moves, the patient or the person requiring care needs the support of the caregiver and/or the care assistant, therefore, a problem arises in that the physical burden on the caregiver and/or the care assistant becomes excessive.

An object of the present invention has been made in view of the circumstances described above, then is to provide an apparatus for movement capable of reducing a physical burden on a caregiver and/or a care assistant.

Solution to Problem

In order to achieve the object described above, the present invention proposes the following means.

An apparatus for movement according to an embodiment of the present invention includes a main frame and a front frame detachably attached to the main frame. The main frame includes a seat face, which has a hole opened in a vertical direction and on which a user sits, and also includes a truck disposed at below of the seat face and opened backward. The front frame includes a front leaning part which is disposed above and forward of the main frame and against which the user sitting on the seat face leans.

Advantageous Effects of Invention

According to the present invention, the apparatus for movement capable of reducing a physical burden on a caregiver and/or a care assistant can be provided.

DESCRIPTION OF EMBODIMENTS

Figure 1:
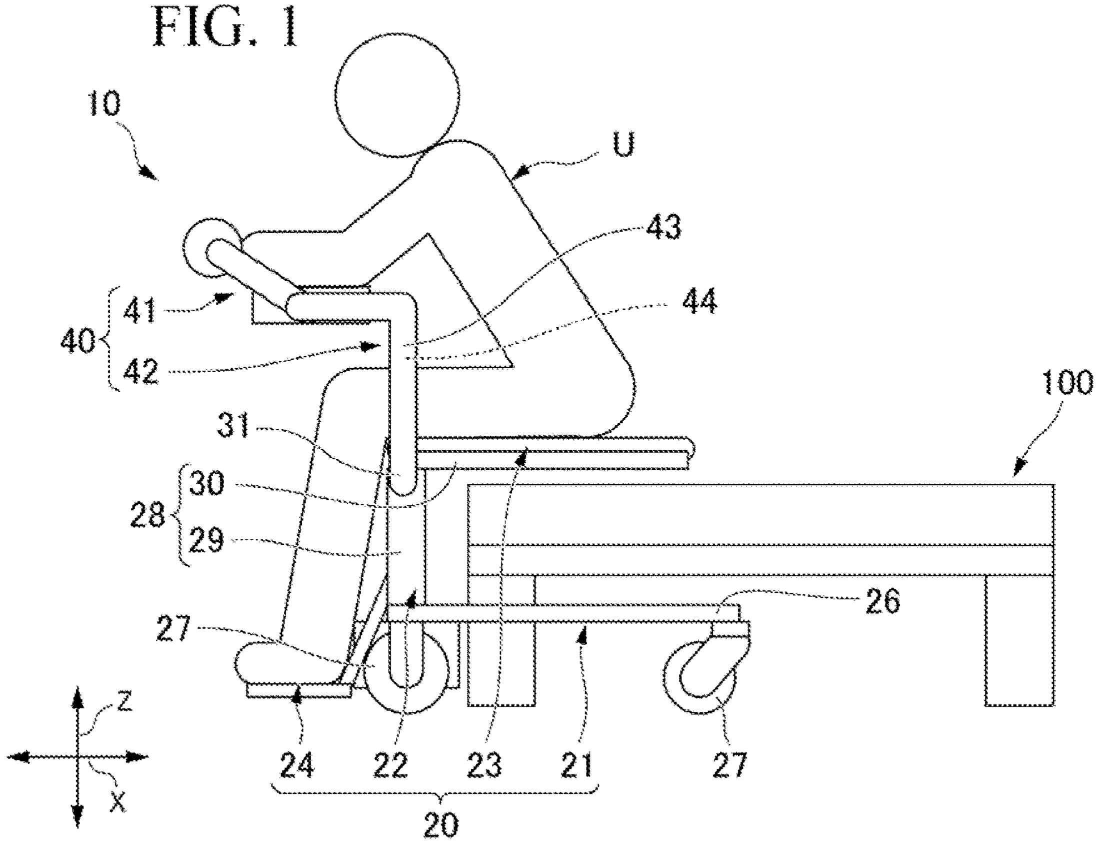
FIG. 1 is a side view of the apparatus for movement according to an embodiment of the present invention when using at a bed.
Figure 2:
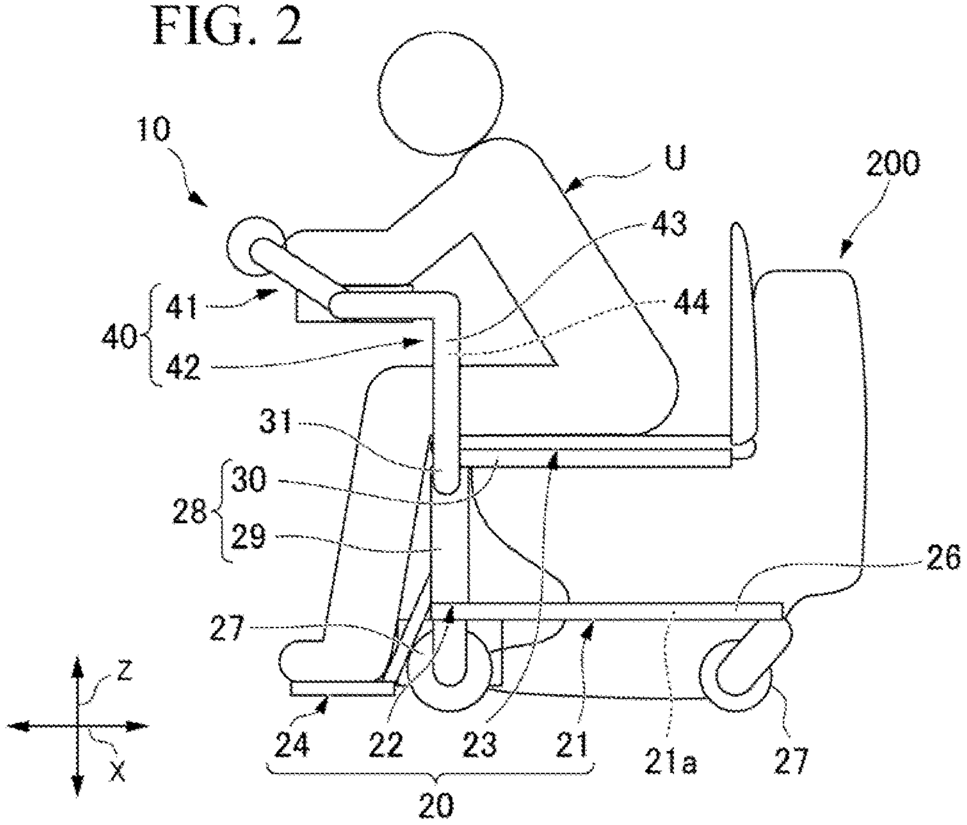
FIG. 2 is a side view of the apparatus for movement according to an embodiment of the present invention when being used at a toilet.
Figure 3:
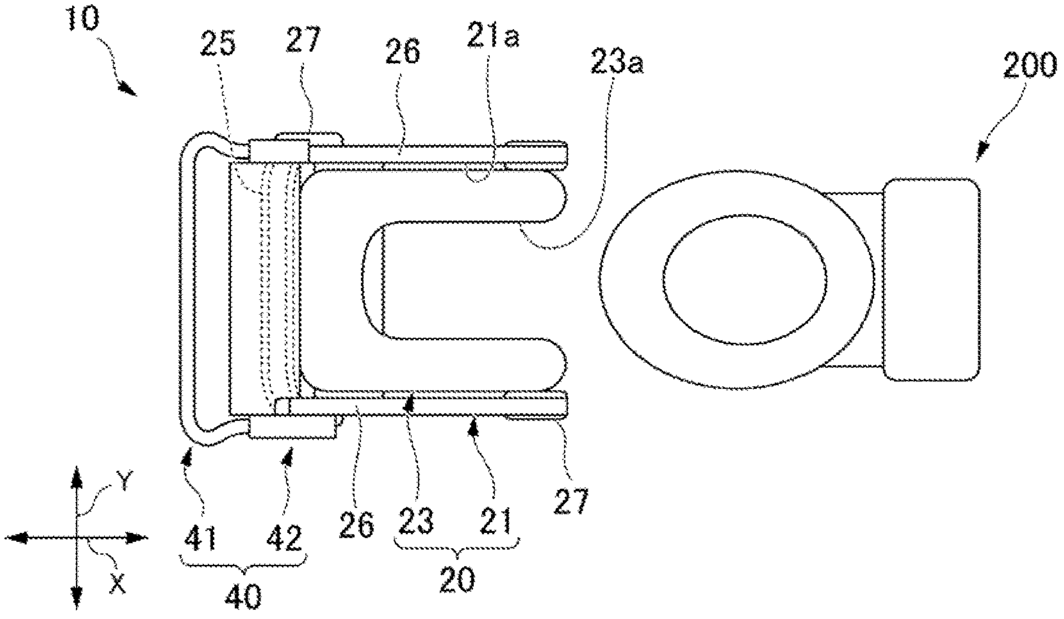
FIG. 3 is a top view showing the relation of the apparatus and a toilet according to an embodiment of the present invention.
Figure 4:
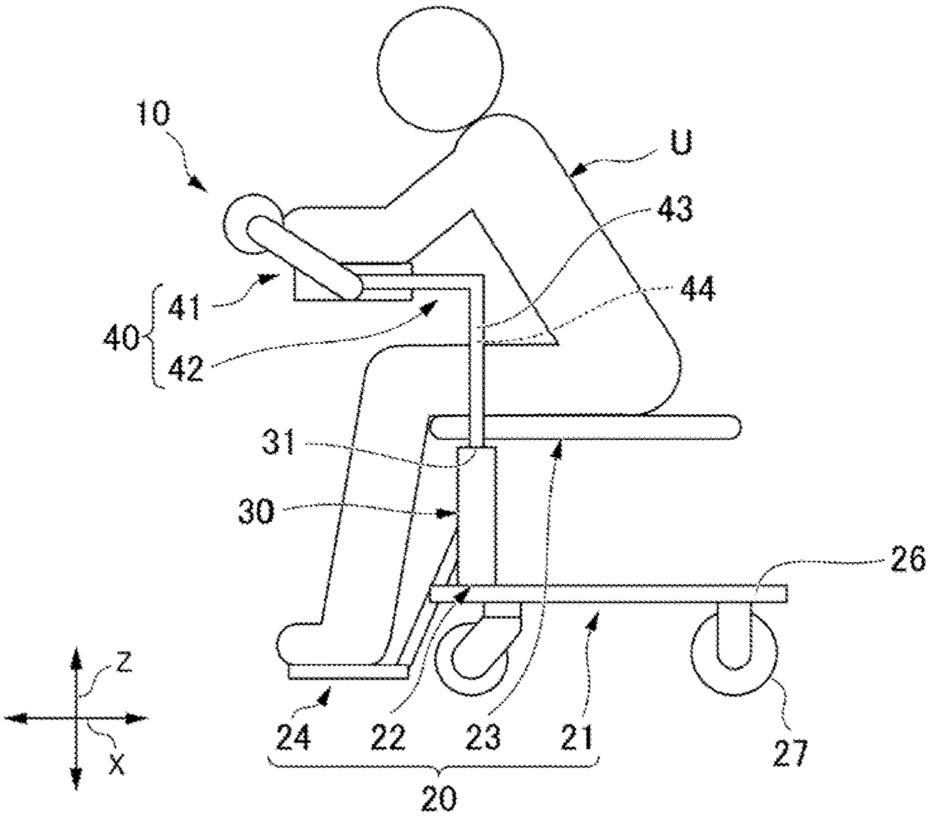
FIG. 4 is a side view of the apparatus for movement according to an embodiment of the present invention when being used.
Figure 5:
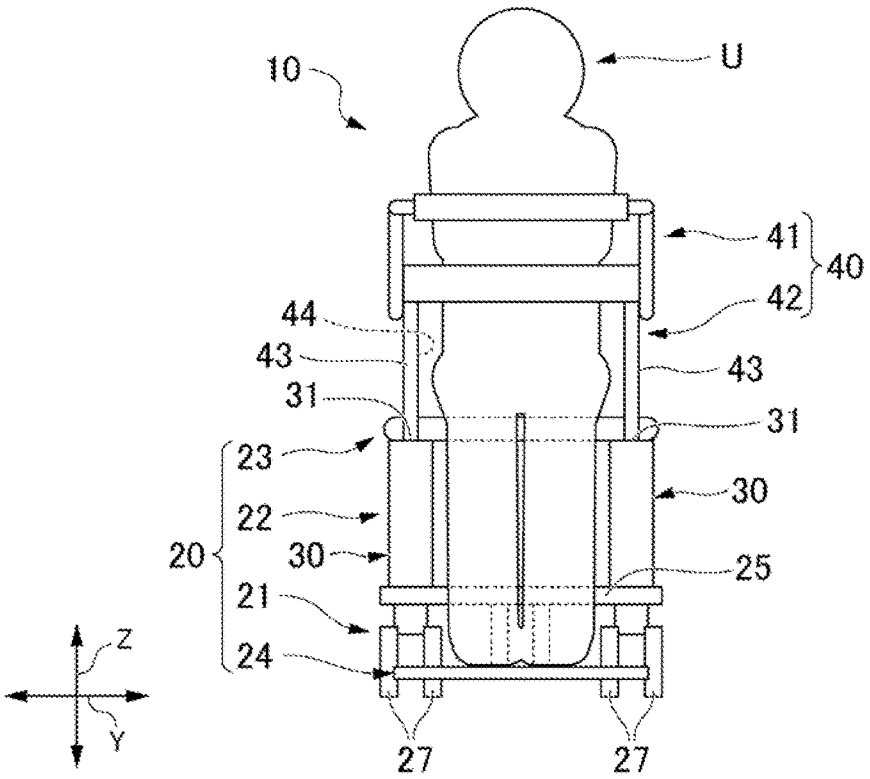
FIG. 5 is an elevation view of the apparatus for movement according to an embodiment of the present invention when being used.
Figure 6:
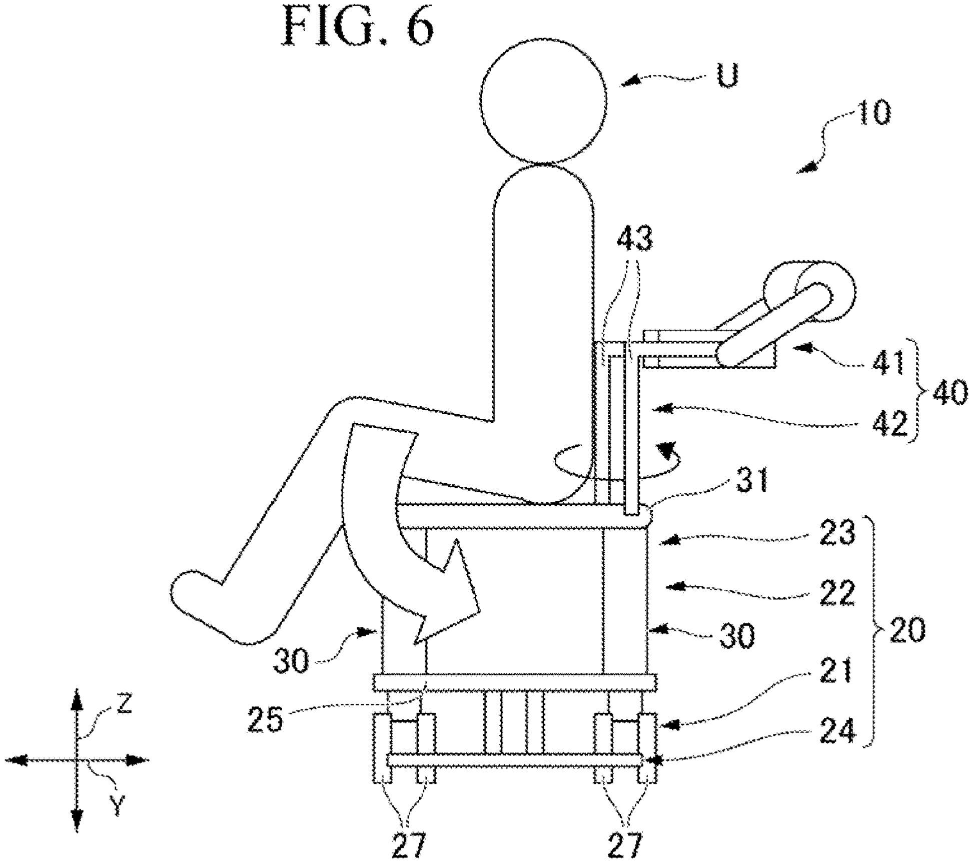
FIG. 6 is an elevation view of the apparatus for movement according to an embodiment of the present invention when being used and is the elevation view showing an open state of a front frame.
Figure 7:
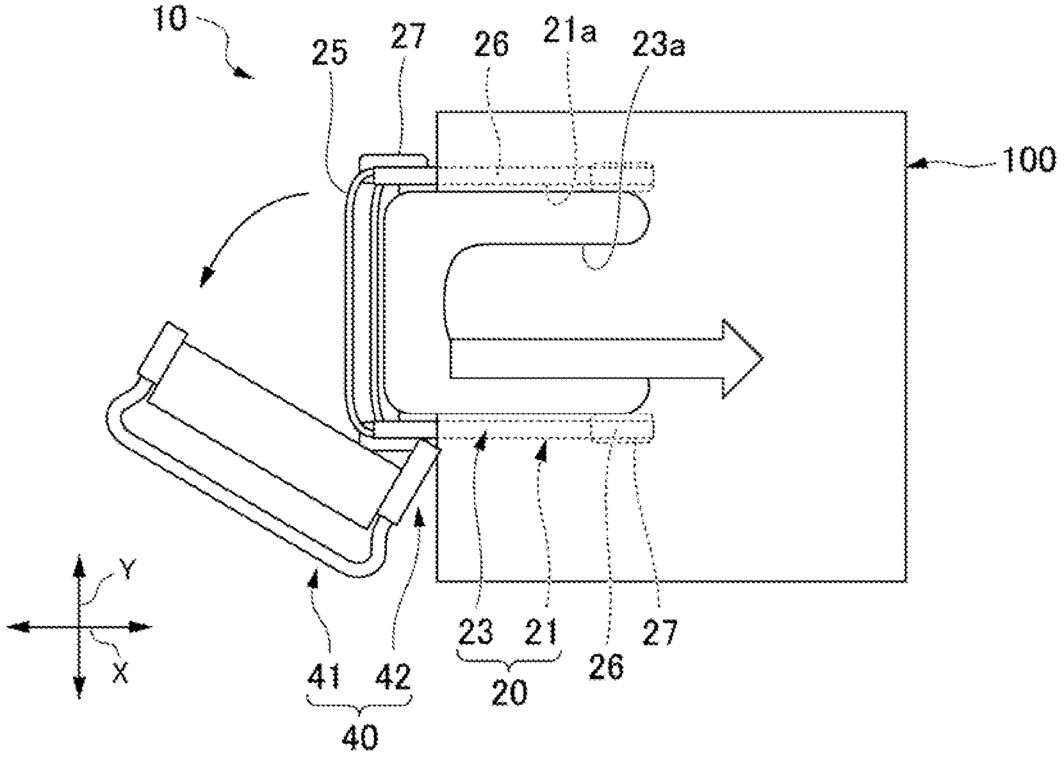
FIG. 7 is a top view of the apparatus for movement according to an embodiment of the present invention when being used and is the top view showing an open state of a front frame.

An apparatus for movement 10 according to an embodiment of the present invention will be described with reference to FIGS. 1 to 13.

As shown in FIGS. 1 to 7, the apparatus for movement 10 includes a main frame 20 and a front frame 40. The apparatus for movement 10 is used for reducing a physical burden on a caregiver and/or a care assistant when moving a patient or a person requiring care. Although the apparatus for movement 10 is assumed to be mainly used when moving a patient or a person requiring care (user U) from a bed 100 to a toilet 200, it may be used for a simple movement.

In the following description, a vertical direction in a state where the apparatus for movement 10 according to the present embodiment is arranged on a flat surface is referred to as a vertical direction Z. When a user U is using the apparatus for movement 10, a front-back direction of the user U is simply referred to as a front-back direction X, and a crosswise direction of the user U is simply referred to as a crosswise direction Y. When saying a front side, a rear side, a left side, and a right side, it means respectively the front side, the rear side, the left side, and the right side in a State where the user U uses the apparatus for movement 10.

(Main Frame 20)

The main frame 20 includes a truck 21, a first connection part 22, a seat face 23, and a footrest 24.

The truck 21 has one front part 25, two rear parts 26 arranged apart from each other in the right and left directions, and a plurality of wheels 27. The front part 25 extends in the crosswise direction Y. The rear parts 26 extend in the front-back direction X, respectively. Each of the left and right ends of the front part 25 is connected to the front end of the rear parts 26. Each of the two rear parts 26 is separated from each other. That is, the truck 21 has a first opening part 21*a* opened backward. The wheels 27 are attached to each of the two tear parts 26. The wheels 27 may be, for example, casters or may be movable in the crosswise direction Y such as an omni-wheel, and may be selected as appropriate.

Considering the distance between the lower end of the bed 100 used by the user U and the floor, the height of the truck 21 is a dimension capable of inserting the truck 21 between the lower end of the bed 100 and the floor. Further, the distance of the crosswise direction Y between the rear parts of the truck 21 (the size of the crosswise direction Y of the first opening part 21*a*) is set larger than at least a width of a general toilet seat.

The first connection part 22 connects the truck 21 and the seat face 23. The first connection part 22 includes two first members 28 arranged apart from each other in right and left directions. Each first member 28 has a trunk part 29 and an arm part 30. The trunk part 29 extends in a vertical direction 2. The arm part 30 extends in a front-back direction X. The arm part 30 extends backward from the upper end of the trunk part 29. The arm part 30 supports the seat face 23.

Each first member 28 can be formed of, for example, a metal pipe. The trunk part 29 and the arm part 30 may be formed by bending one pipe. The pipe forming the trunk part 29 and the pipe forming the arm part 30 may be different pipes, and the first member 28 may be formed by welding the two pipes.

A position of the arm part 30 in the vertical direction Z is higher than a high floor type sleeping equipment (bed 100) used by the user U. Preferably, the position of the arm portion 30 in the vertical direction Z is such a height that it can be disposed so as to contact the upper surface of the bed 100 (including a mattress or a futon, if it is laid). In addition, it is preferable that the first connection part 22 includes an adjusting mechanism (not shown). The adjustment mechanism adjusts the height of the seat face 23. As the adjustment mechanism, for example, a structure for lifting the arm part 30 relative to the trunk part 29 can be adopted. As the adjusting mechanism of this kind, for example, a cylinder provided on the trunk part 29 and having a rod extending and contracting in the vertical direction Z can be adopted. In this case, the position of the arm part 30 in the vertical direction 2 can be adjusted according to the height of the bed 100. Therefore, the versatility of the apparatus for movement 10 is improved.

The seat face 23 is arranged above the truck 21. The seat face 23 has a second opening part 23*a*, that is, a hole opened in the vertical direction Z. The seat face 23 is a plate-like member extending in a horizontal direction. The seat face 23 is attached to the upper side of the arm part 30. The second opening part 23*a* is opened backward. The seat face 23 is U-shaped in a plan view. As a method of attaching the seat face 23 to the first connection part 22 (arm part 30), for example, fixing by a bolt is cited. The seat face 23 may be attachable to and detachable from the first connection part 22. The seat face 23 is made of resin, for example.

The footrest 24 is arranged at forward and below of the seat face 23. The footrest 24 is positioned in front of the truck 21. The foot of the user U sitting on the seat face 23 is placed on the footrest 24. The footrest 24 is connected to the first connection part 22.

(Front Frame 40)

The front frame 40 includes a front leaning part 41 and a second connection part 42.

The front leaning part 41 is arranged at above and forward of the main frame 20. The user U sitting on the seat face 23 leans against the front leaning part 41. The arm of the user U is placed on the front leaning part 41. The surface of the front leaning part 41 may be covered with synthetic leather or the like and have cushioning properties in consideration of comfort of the user U.

The second connection part 42 connects the main frame 20 and the front leaning part 41. A lower end of the second connection part 42 is connected to the main frame 20. An upper end of the second connection part 42 is connected to the front leaning part 41. The second connection part 42 has two second members 43 arranged apart from each other in the right and left directions. Each second member 43 extends in a vertical direction 2. A space in which the user U can insert the feet (insertion part 44) is provided between the two second members 43. Each of the second members 43 may be formed of, for example, a metal pipe.

Figure 8:
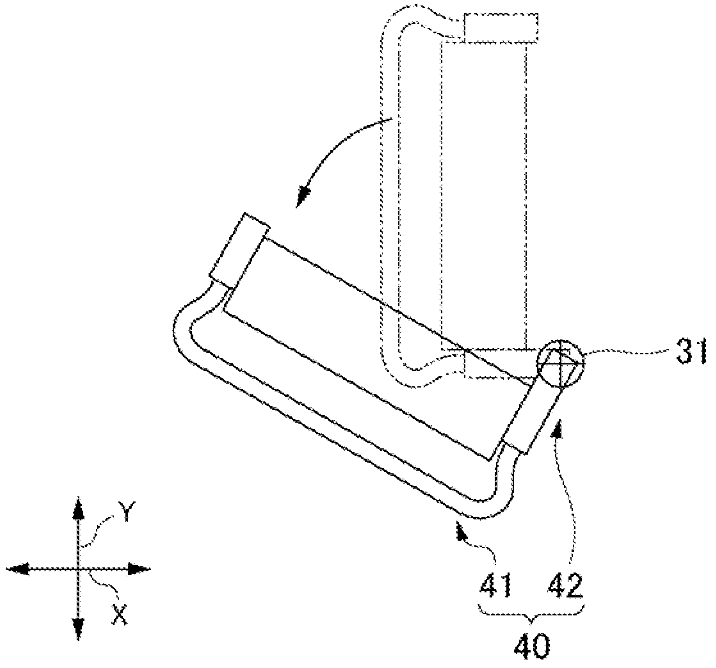
FIG. 8 is a top view of a front frame of the apparatus for movement according to an embodiment of the present invention and is the top view comparing an open state (solid line) and a closed state (broken line) of the front frame.
Figure 9:
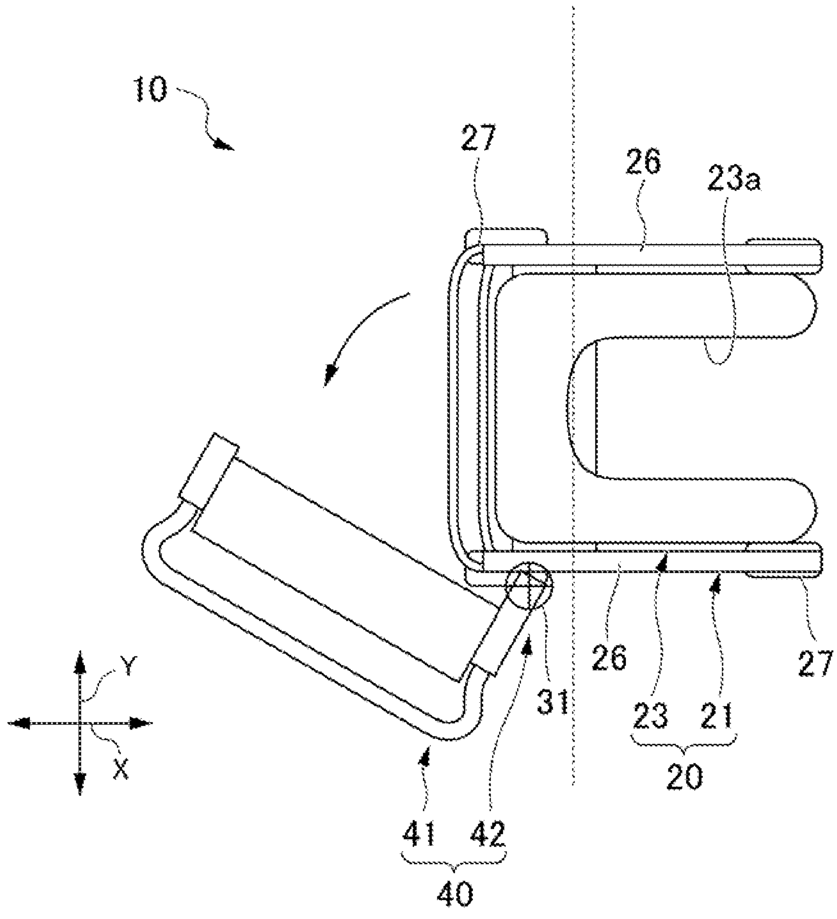
FIG. 9 is a top view of the apparatus for movement according to an embodiment of the present invention and is the top view showing an open state of a front frame.

As shown in FIGS. 8 and 9, the front frame 40 is detachably mounted to the main frame 20. Here, what the front frame 40 can be attached to and detached from the main frame 20 includes a configuration in which the front frame 40 can be completely separated from the main frame 20. What the front frame 40 can be attached to and detached from the main frame 20 further includes, in a state where a part of the front frame 40 is fixed to the main frame 20, a configuration in which the only remaining part of the front frame 40 can be separated from the main frame 20.

As shown in FIGS. 5 to 9, in the present embodiment, the main frame 20 is provided with mounting parts 31 separated from each other in the right and left directions. The main frame 20 includes two mounting parts 31. The mounting parts 31 are provided, for example, to the first connection parts 22. In this embodiment, the mounting parts 31 are formed by holes disposed at the upper end of the truck parts 29.

The front frame 40 is attached to the mounting parts 31. Second connection parts 42 of the front frame 40 are attached to the mounting parts 31. In this embodiment, the lower end of each second member 43 is attached to each attachment portion 31.

The front frame 40 can be opened and closed so as to rotate around a vertical direction Z with one of the mounting parts 31 as a fulcrum. In the present embodiment, one of the two second members 43 keeps a state being inserted into one of the two mounting ports 31, while the other of the two second members 43 is detachably attached to the other of the two mounting ports 31. Thus, when the second member 43 is removed from the other of the two mounting parts 31, the front frame 40 is rotatable around an axis extending in the vertical direction Z with the second member 43 inserted into one of the two mounting parts 31 as an axis.

Hereinafter, the front frame 40 is made rotatable as described above, and the state in which the front frame 40 is rotated is referred to as an open state, while the state in which the two second members 43 are attached (fixed) to the two mounting parts 31 is referred to as a closed state.

(Method of Moving)

Hereinafter, an example of a method (procedure) that the caregiver moves the user U will be described. And, in an initial stage, it is assumed that the user U lies on the bed 100.

First, the caregiver pushes the apparatus for movement 10 to the front of the bed 100, and arranges it on the side part of the bed 100.

Second, the caregiver moves the position of the user U to one side of the bed 100 (the opposite side to the side where the apparatus for movement 10 is inserted).

Figure 10:
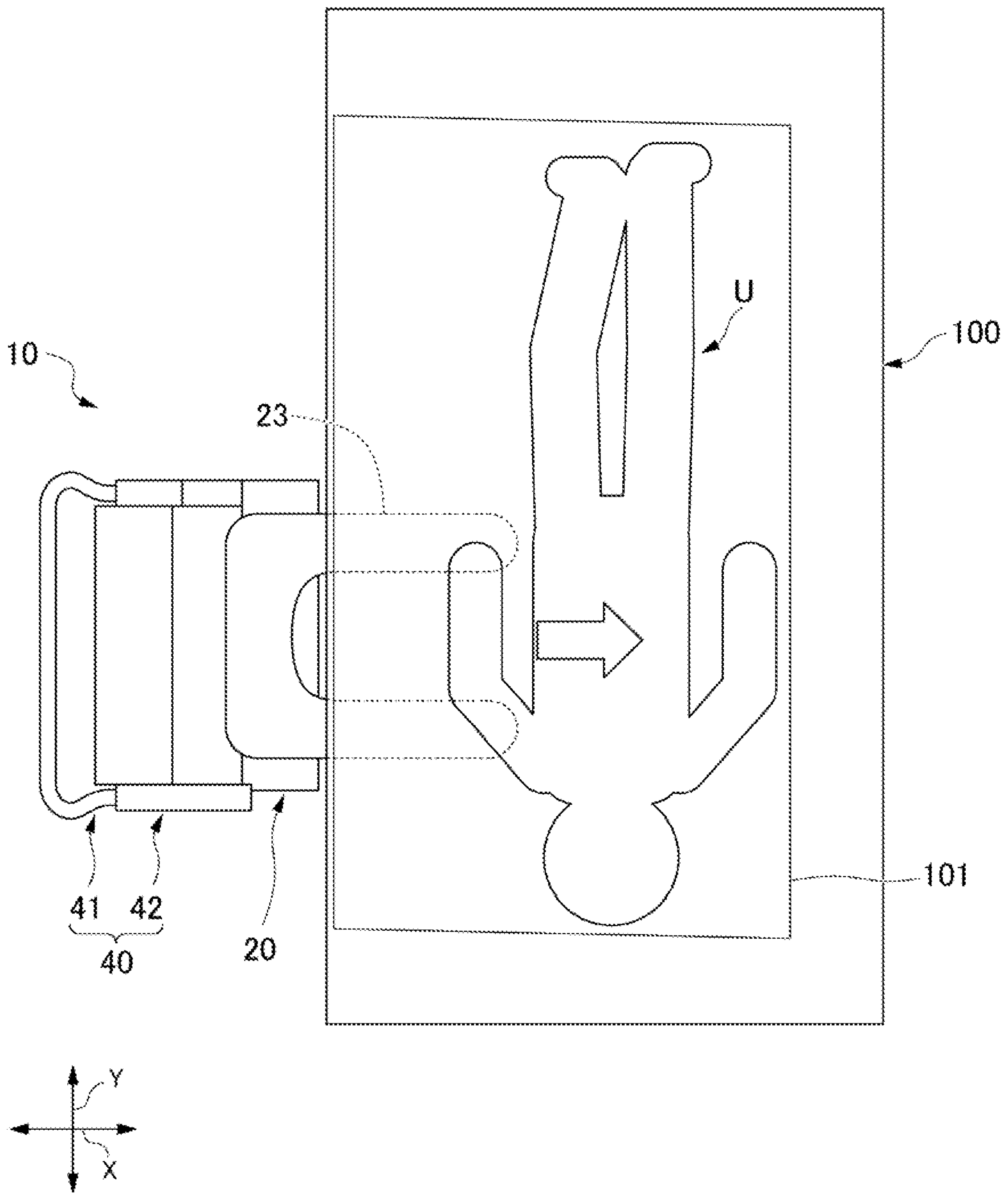
FIG. 10 is a top view of the apparatus for movement according to an embodiment of the present invention when being used.

Third, as shown in FIG. 10, the caregiver inserts the apparatus for movement 10 into the bed 100 from the rear side of the apparatus for movement 10. At this time, the seat face 23 is positioned above the bed 100, and the truck 21 is positioned below the bed 100 (sleeping equipment). Further, at this time, the seat face 23 is positioned near the hip of the user U. In addition, it is preferable that a cloth 101 for moving the user U, such as a sheet of a bed 100, is disposed on the seat face.

Figure 11:
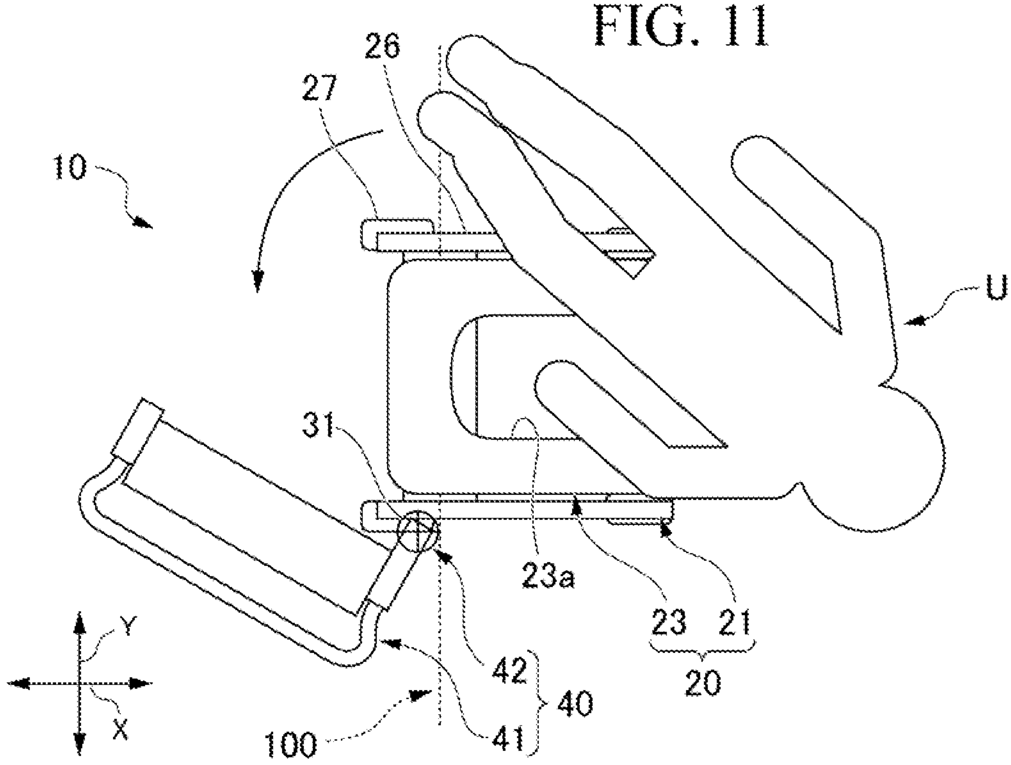
FIG. 11 is a top view of the apparatus for movement according to an embodiment of the present invention when being used.

Fourth, as shown in FIG. 11, the caregiver makes the front frame 40 open state.

Fifth, the caregiver rotates the user U with the hip as a fulcrum, makes a state in which the legs of the user U are positioned at the front side of the apparatus for movement 10, and makes a state in which the hip is put on the seat face 23. At this time, the care assistant preferably uses the cloth 101 described above.

Figure 12:
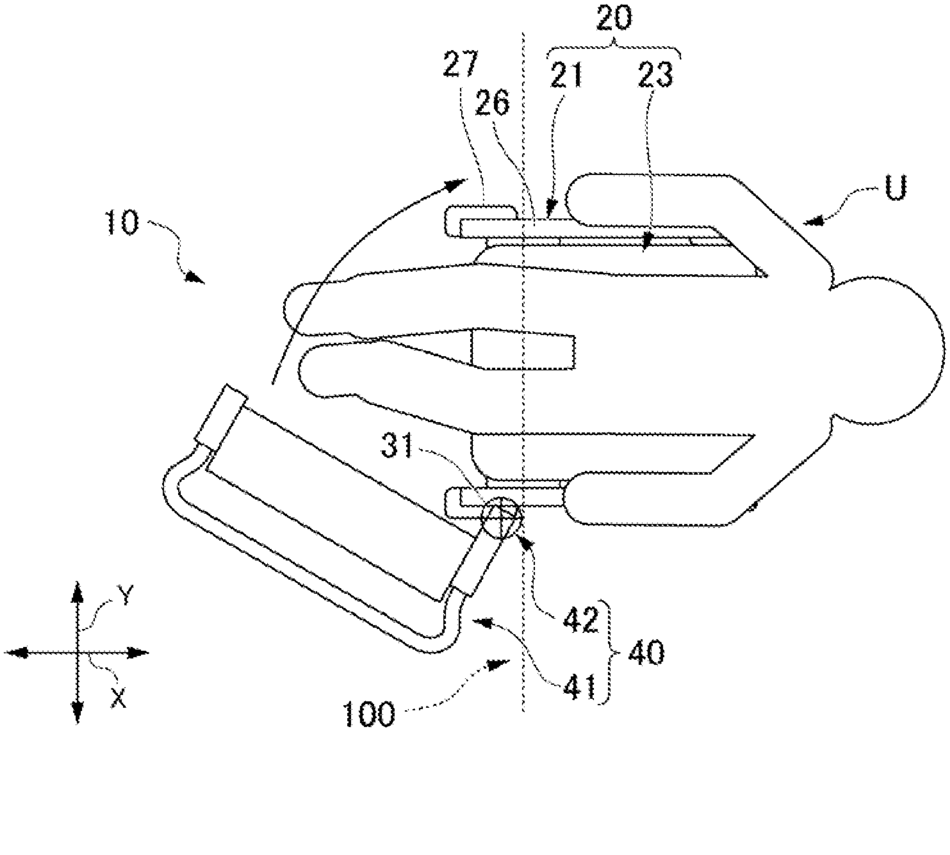
FIG. 12 is a top view of the apparatus for movement according to an embodiment of the present invention when being used.

Sixth, as shown in FIG. 12, the caregiver closes the front frame 40 with a state of keeping the position where the feet of the user U do not touch the front frame 40.

Seventh, the caregiver raises the upper body of the user U, and positions the hands of the user U so as to contact on the upper side of the front leaning part 41.

Eighth, the caregiver moves the apparatus for movement 10 to the front of the seat of the toilet 200.

Ninth, the caregiver moves the apparatus for movement 10 from the rear of the apparatus for movement 10 so that the toilet seat is along the first opening 21*a* of the truck 21. At this time, the caregiver fine-adjusts the position of the apparatus for movement 10 so that the seat face 23 is positioned above the toilet seat. Thus, the second opening part 23*a* of the seat face 23 is positioned above the toilet seat.

Tenth, the caregiver confirms that the user U has finished discharging and moves the user U to the bed 100. (a method of moving from the toilet 200 to the bed 100 is omitted, because the reverse procedures of the first to the ninth are only performed)

Figure 13:
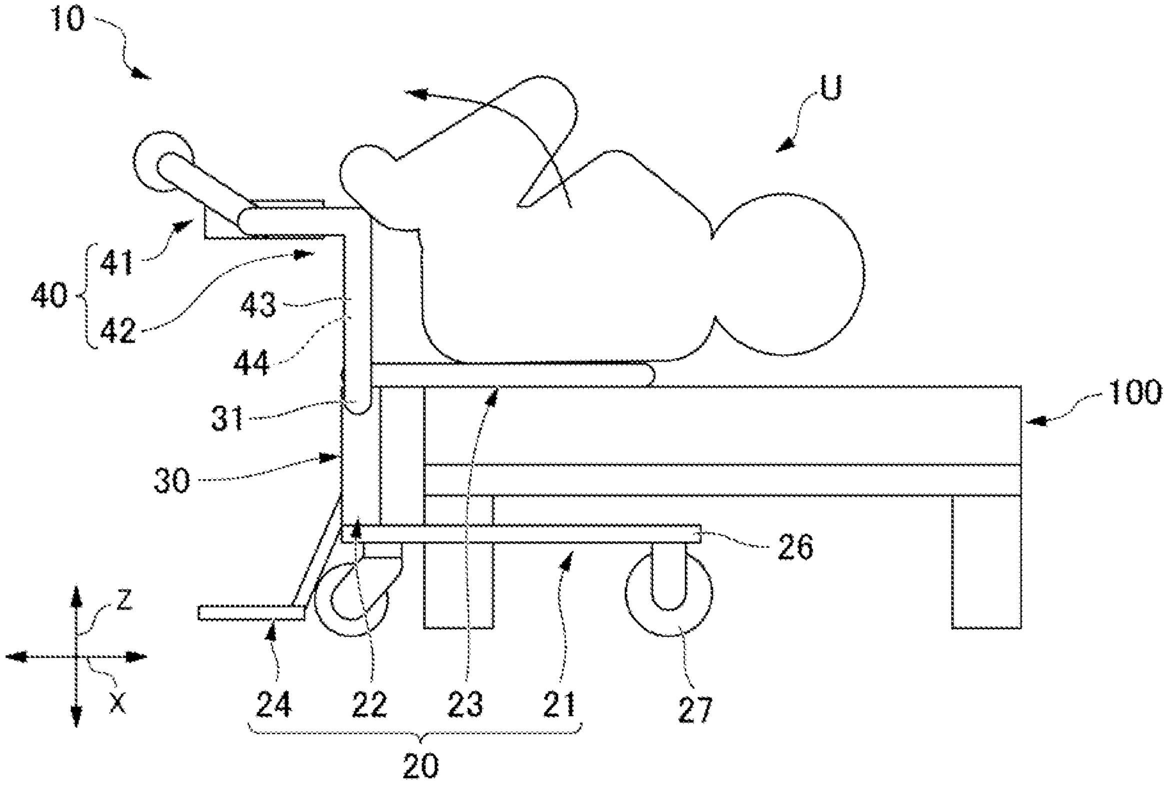
FIG. 13 is a side view of the apparatus for movement according to an embodiment of the present invention when being used.

In addition, in the above procedure, the caregiver performs the operation of opening and closing the front frame 40, but there is a case of no performing. For example, as shown in FIG. 13, with moving a relatively small user U, while the caregiver rotates the user U with the hip as a fulcrum, the caregiver bends the legs of the user U so as to be a Z-shape in a side view. Then, in a stage where the legs of the user U are arranged on the front side of the apparatus for movement 10 and the hip is put on the seat face 23, the caregiver makes the legs of the user U extend so as to insert into the insertion part 44. Thus, the caregiver can omit the opening/closing operation with respect to the front frame 40.

As described above, by virtue of the apparatus for movement 10 according to the embodiment, the seat face 23 and the truck 21 are arranged so as to sandwich the bed 100 vertically. As a result, it is possible, without lifting the patient or the person requiring care lying on the bed 100, to move the patient or the person requiring care to put on the seat face 23, and to position the arms of the patient or the person requiring care on the front leaning part 41.

Further, since the truck 21 is attached to the lower side of the main frame 20, opened to the rearward, and formed into a U-shape in a plan view, and the seat face 23 has the hole, it is possible to move the patient or the person requiring care with keeping on the apparatus for movement 10 on the seat of the toilet 200, then the patient or the person requiring care allow to discharge as-is.

Therefore, it is possible, without never lifting the patient or the person requiring care, to move the patient or the person requiring care between the bed 100 and the toilet 200, and to reduce the physical burden on the caregiver and/or the care assistant.

Further, the front frame 40 can be opened and closed so as to rotate around the vertical direction Z as a axis with the mounting part 31 as a fulcrum.

Therefore, since arranging the apparatus for movement 10 so as to insert the seat face 23 between the back or the hip of the patient or the person requiring care and the bed 100, and rotating the patient or the person requiring care with the hip of the patient or the person requiring care as a fulcrum, it is possible to easily move and seat the patient or the person requiring care on the seat face 23 without lifting, and to reduce the physical burden on the caregiver and/or the care assistant.

In addition, the technical scope of the present invention is not limited to the embodiment described above, various changes and modifications can be made without departing from the spirit of the present invention.

Figure 14:
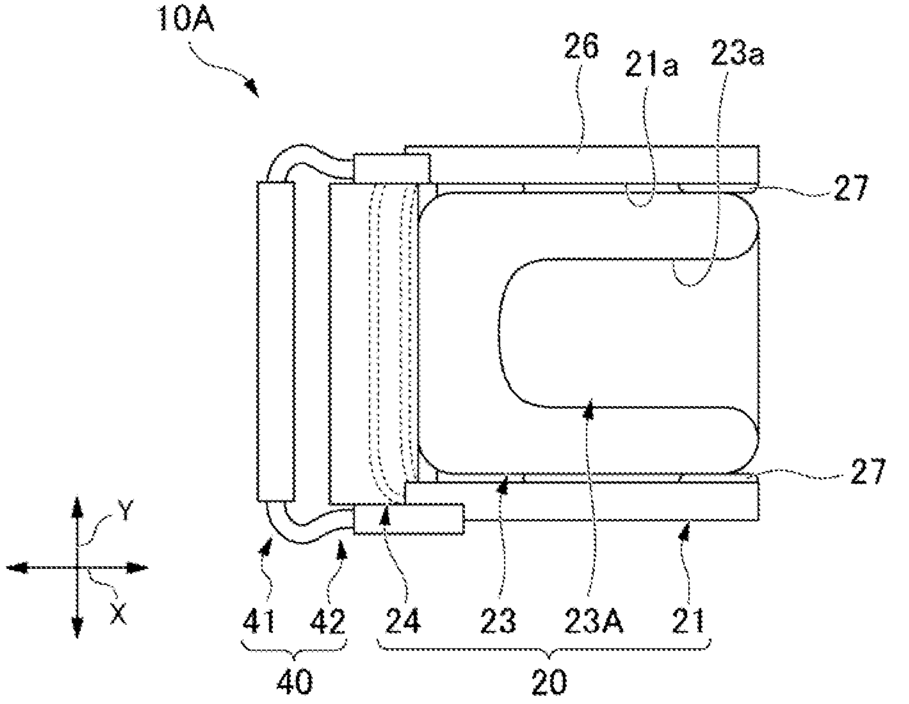
FIG. 14 is a top view of the apparatus for movement according to a first variation of the present invention.

As in an apparatus for movement 10A according to a first modification shown in FIG. 14, an auxiliary seat face 23A may be detachably mounted on the seat face 23. The auxiliary seat face 23A is provided so as to fill a second opening part 23*a*. In this case, for example, it is preferable that when moving with the apparatus for movement 10A, the auxiliary seat face 23A is attached to the seat face 23, and when assembling the apparatus for movement 10A to the toilet 200, the auxiliary seat face 23A is removed from the seat face 23.

Figure 15:
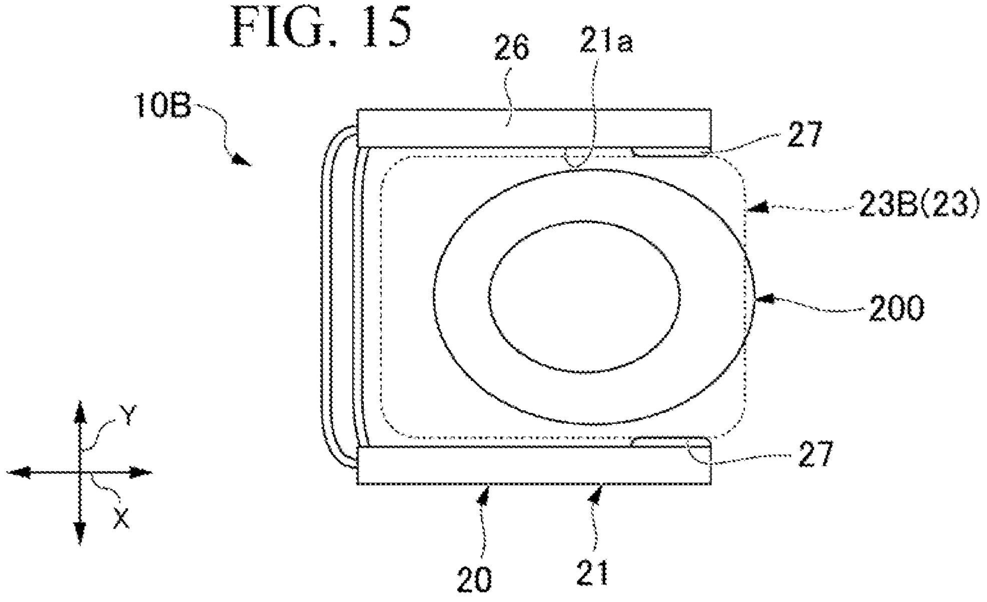
FIG. 15 is a top view of the apparatus for movement according to a second variation of the present invention.
Figure 16:
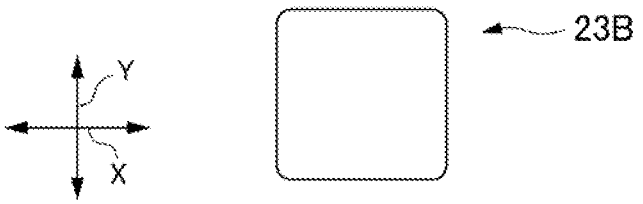
FIG. 16 is an example of a seat face to be attached to the apparatus for movement shown in FIG. 15.

As in an apparatus for movement 10B according to a second modification shown in FIG. 15, the seat face 23 may be detachably provided with respect to the main frame 20. In this case, the apparatus for movement 10 B may have a plurality of kinds of seat faces 23 and 23 B. The apparatus for movement 10B, in addition to the U-shaped seat face 23 in plan view, can adopt a seat face 23B without second opening 23*a* as shown in FIG. 16, for example. In this case, for example, it is preferable that when moving with the apparatus for movement 10, the seat face 23B is attached, and when assembling the apparatus for movement 10B to the toilet 200, the seat face 23B is replaced to the seat surface 23.

Figure 17:
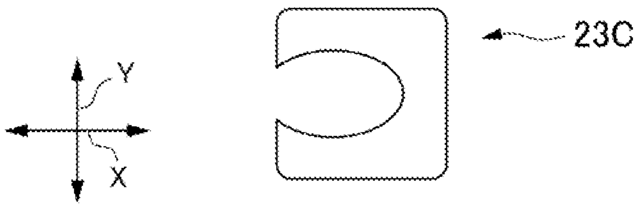
FIG. 17 shows a seat face to be employed in the apparatus for movement according to a third variation of the present invention.

As a seat face 23C adopted in an apparatus for movement (not shown) according to a third modification shown in FIG. 17, the seat face 23 may have a U-shape opening forward. In this case, since seat face 230 is opened forward, the seat face 23C can be prevented from being soiled by scattering of urine, and maintenance efficiency is improved.

Figure 18:
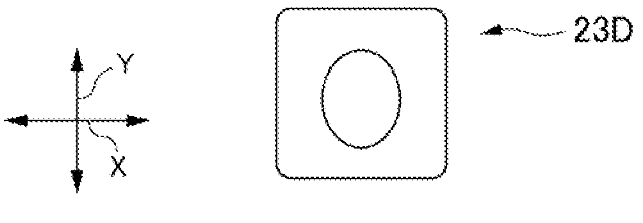
FIG. 18 shows a seat face to be employed in the apparatus for movement according to a fourth variation of the present invention.

As a seat face 23D adopted in an apparatus for movement (not shown) according to a fourth modification shown in FIG. 18, the seat face 23D may have an O-shape which is not opened to both of the forward and rearward, and is opened only in the vertical direction Z.

Figure 19:
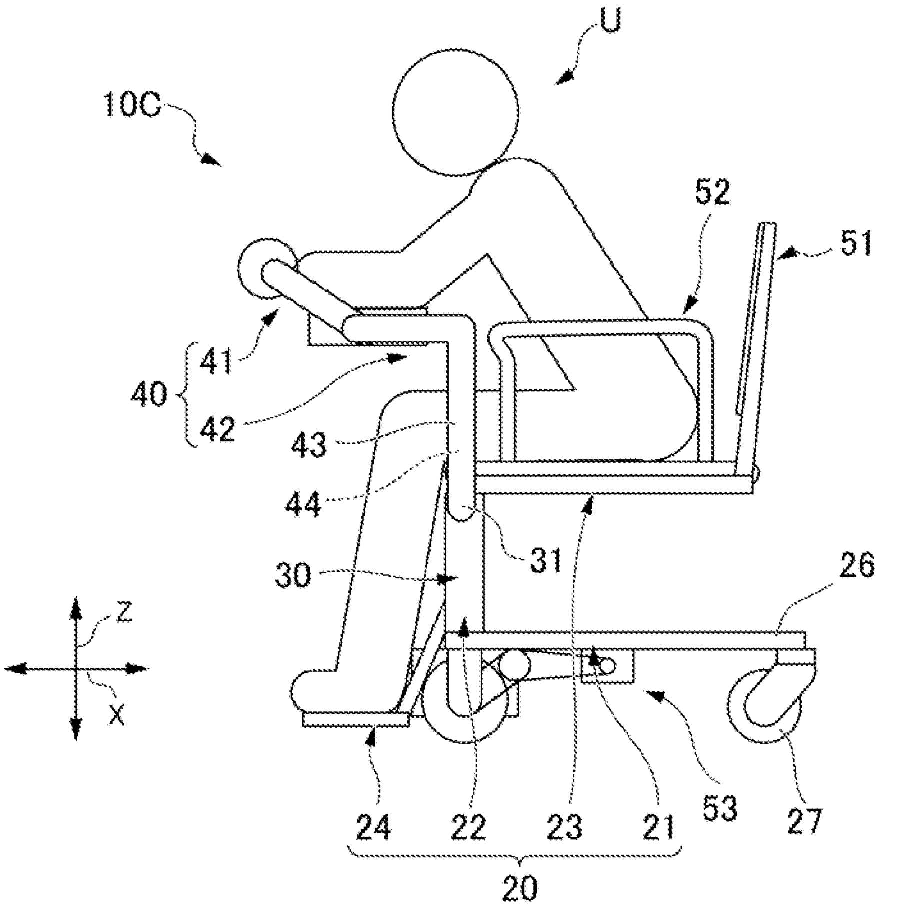
FIG. 19 is a side view of the apparatus for movement according to a fifth variation of the present invention.

As in an apparatus for movement 10C according to a fifth modification shown in FIG. 19, the apparatus for movement 10C may include a backrest part 51, a handrail part 52, and a driving device 53.

The backrest part 51 is detachably provided to an end part of the rear side of the main frame 20. The backrest part 51 is formed of, for example, a metal pipe.

Thus, the back of the user U can be supported even when the user U is difficult to take a forward tilting posture with a state of sitting on the seat face 23 of the apparatus for movement 10C. Further, when putting the user U on the apparatus for movement 10C, the backrest part 51 can be removed.

The handrail part 52 is detachably provided to at least one end part of two ends in the crosswise direction Y of the main frame 20. The handrail part 52 is formed of, for example, a metal pipe.

As a result, even when the user U loses the posture with a state of sitting on the seat face 23 of the apparatus for movement 10C, the user U can prevent from falling from the apparatus for movement 10. Further, when putting the user U on the apparatus for movement 10C, the handrail part 52 can be removed.

The driving device 53 is, for example, a motor for driving wheels 27 attached to the truck 21. The driving device 53 is connected to a control unit (not shown) and an operation unit (not shown). The control unit is a control device that controls power to be supplied to the motor. The operation unit is used for the care assistant to input a signal for controlling the drive device 53 to the control unit. The operation unit is attached, for example, to either right or left end part of the front leaning part 41 of the front frame 40.

The backrest part 51 and the handrail part 52 prevent the patient or the person requiring care from falling from the seat face 23 when transporting the patient or the person requiring care on the apparatus for movement 10. As a result, the safety is improved.

When transporting the patient or the person requiring care on the apparatus for movement 10C, the drive device 53 allow to become unnecessary to manually move the apparatus for movement 10C. As a result, it is possible to reduce the physical burden on the caregiver and/or the care assistant.

In addition, the backrest part 51, the handrail part 52 and the apparatus for movement 10C may be provided with only one or only two of them.

An adjusting mechanism may be eliminated. The footrest 24 may be eliminated.

In addition, it is possible to replace the components in the above-mentioned embodiments with well-known components without departing from the spirit of the present invention, and the above-mentioned modifications may be appropriately combined.

INDUSTRIAL APPLICABILITY

According to the present invention, the apparatus for movement capable of reducing the physical burden on the caregiver and/or the care assistant can be provided. Therefore, the industrial applicability is high.

REFERENCE SIGNS LIST

10, 10A, 10B, 10C Apparatus for movement
20 Main frame
21 Truck
23, 23B, 23C, 23D Seat face
24 Footrest
31 Mounting part
40 Front frame
41 Front leaning part
U User
Vertical direction

The invention claimed is:

1. An apparatus for movement, comprising:
a main frame; and
a front frame detachably attached to the main frame, wherein
the main frame includes a seat face, which has a hole opened in a vertical direction and on which a user sits, and also includes a truck disposed below the seat face and opened backward; and
the front frame includes a front leaning part which is disposed above and forward of the main frame and against which the user sitting on the seat face leans.

2. The apparatus for movement according to claim 1, wherein
the main frame is provided with mounting parts separated from each other in the right and left directions, and
the front frame is attached to the mounting parts, and can be opened and closed so as to rotate with a vertical direction as an axis and with one of the mounting parts as a fulcrum.

3. The apparatus for movement according to claim 1, wherein
the seat face is detachably provided to the main frame.

4. The apparatus for movement according to claim 1, wherein
the main frame comprises an adjustment mechanism that adjusts a height of the seat face.

5. The apparatus for movement according to claim 1, further comprising a footrest disposed forward and below the seat face.

* * * * *